United States Patent
Itoh et al.

(10) Patent No.: US 7,492,929 B2
(45) Date of Patent: Feb. 17, 2009

(54) IMAGE MATCHING DEVICE CAPABLE OF PERFORMING IMAGE MATCHING PROCESS IN SHORT PROCESSING TIME WITH LOW POWER CONSUMPTION

(75) Inventors: Yasufumi Itoh, Tenri (JP); Manabu Yumoto, Nara (JP); Manabu Onozaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 862 days.

(21) Appl. No.: 11/092,573

(22) Filed: Mar. 29, 2005

(65) Prior Publication Data
US 2005/0220328 A1    Oct. 6, 2005

(30) Foreign Application Priority Data
Mar. 30, 2004   (JP) ............... 2004-098038

(51) Int. Cl.
*G06K 9/00* (2006.01)
(52) U.S. Cl. .................. 382/124; 382/209
(58) Field of Classification Search ........ 382/124, 382/181, 190, 209, 217–219, 224, 305
See application file for complete search history.

(56) References Cited

U.S. PATENT DOCUMENTS 6,597,802 B1 * 7/2003 Bolle et al. ............ 382/124

2004/0228508 A1 * 11/2004 Shigeta ................. 382/124

FOREIGN PATENT DOCUMENTS

| JP | 4-324583 A | 11/1992 |
|----|------------|---------|
| JP | 6-68241 A | 3/1994 |
| JP | 10-143663 A | 5/1998 |
| JP | 2002-83299 A | 3/2002 |
| JP | 2003-323618 A | 11/2003 |
| JP | 2004-21615 A | 1/2004 |

OTHER PUBLICATIONS

Tamura, H., Introduction to Computer Image Processing, pp. 66-69 and 98-99, (1985).

* cited by examiner

*Primary Examiner*—Daniel G Mariam
(74) *Attorney, Agent, or Firm*—Birch, Stewart, Kolasch & Birch, LLP (57) ABSTRACT

An image matching device capable of matching two images performs the following processes in order to shorten a processing time and reduce power consumption. Template matching is performed between a first image and a second image using a predetermined partial image of the first image, and the similarity between the two images is calculated. The similarity thus obtained is compared with a predetermined threshold. Only upon determination that the similarity obtained and the predetermined threshold neither coincide not fail to coincide with each other, the partial image used for template matching is gradually increased until the similarity and the predetermined threshold come to coincide or fail to coincide with each other. Then, template matching is performed again and the similarity between them is calculated.

12 Claims, 9 Drawing Sheets

IMAGE MATCHING DEVICE CAPABLE OF PERFORMING IMAGE MATCHING PROCESS IN SHORT PROCESSING TIME WITH LOW POWER CONSUMPTION

This nonprovisional application is based on Japanese Patent Application No. 2004-098038 filed with the Japan Patent Office on Mar. 30, 2004, the entire contents of which are hereby incorporated by reference.

BACKGROUND OF THE INVENTION

1. Field of the Invention

The present invention relates to an image matching device, an image matching method and an image matching program product. In particular, the present invention relates to an image matching device, an image matching method and an image matching program product for matching two images with each other.

2. Description of the Background Art

Several methods of matching fingerprint images have been proposed.

Japanese Patent Laying-Open No. 2003-323618, for example, discloses an image matching device employing the matching method described below. Specifically, in the image matching device disclosed in this publication, a fingerprint image to be matched is divided into a plurality of partial regions, and all the sensing regions are searched to seek a position in a template image where similarity with each of the partial regions is highest. Based on the distribution of the moving vector between a sensing image and a template image highest in match, it is determined whether a particular fingerprint image is identical to the fingerprint on the template image.

Specifically, in the image matching device disclosed in the patent publication cited above, a plurality of partial regions are set in one of two images to be matched, and the other image is searched for a partial region of maximum similarity as a position of maximum similarity.

Currently, the use and ownership of commercial products based on the biometric personal authentication technologies including fingerprint matching are extending. Further, the personal authentication technologies have come to be widely used for such commercial products as portable terminals including mobile phones and PDAs (Personal Digital Assistants) carried by individual persons.

In the personal authentication technologies, the shortening the processing time is crucial. Especially during the spread of the personal authentication technologies, a shorter processing time is an indispensable factor to gain an advantageous position in business competition. Specifically, in an application of the personal authentication technologies to the portable terminals lacking a sufficiently large battery capacity, the reduction in power consumption as well as the shortening the time required for the matching process is a crucial problem.

In the conventional personal authentication technologies employing the matching method as disclosed in the aforementioned patent publication, however, one of the images is divided into a plurality of partial regions and the position of maximum similarity is searched for all the partial regions to search for a data. Therefore, the problem is posed that an excessively large processing time and power are consumed.

Figure 7:
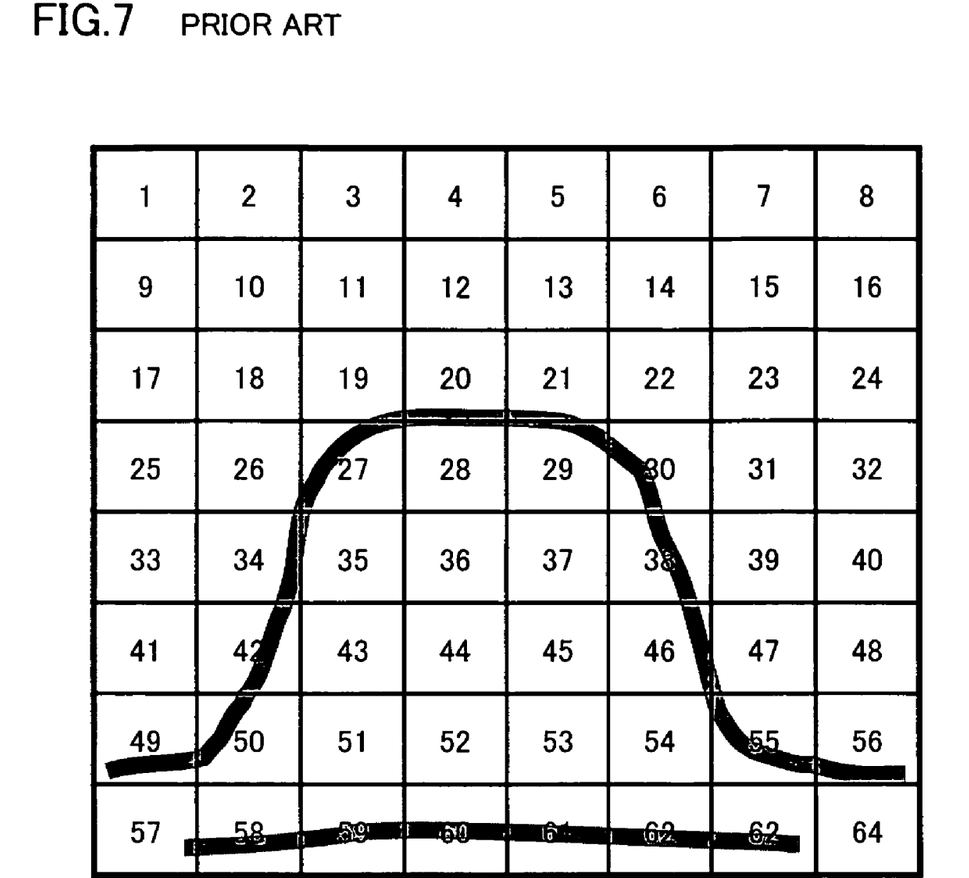

With reference to FIGS. 7 to 10C, the processing amount required of the data search method according to the prior art is described. FIG. 7 is a diagram showing a specific example of an image A to be matched. The process executed to match this image A with an image B is described.

First, as shown in FIG. 7, image A to be matched is divided into partial regions R1 to R64 each having a width of 16 and a height of 16, and the partial regions R1 to R64 are matched in that order.

Figure 8A:
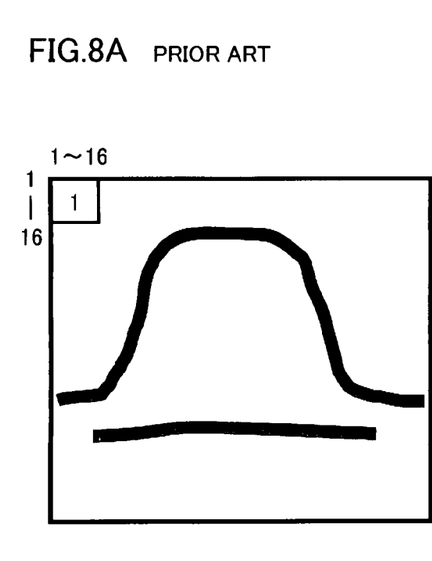
Figure 8B:
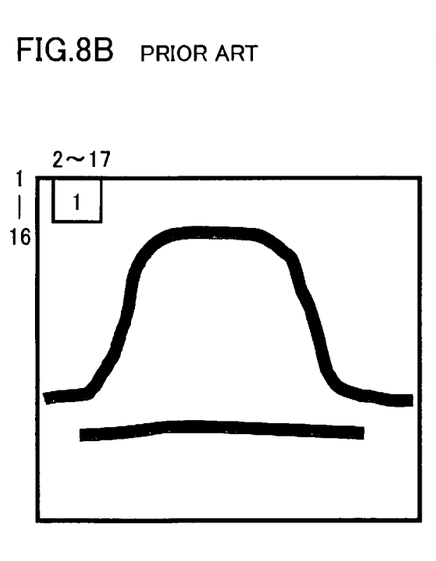
Figure 8C:
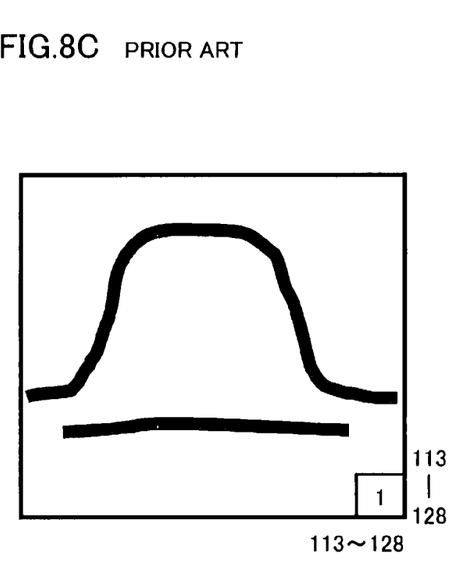

FIGS. 8A to 8C are diagrams for specifically describing the process of searching for the position of maximum similarity in image B with which the partial region R1 of image A has the highest match.

As shown in FIGS. 8A to 8C, a partial region corresponding to partial region R1 of image A is set at the coordinate (1, 1) of image B in a coordinate system with the upper left corner of image B as an origin (FIG. 8A), and the position of maximum similarity is searched for the particular partial region. Next, the partial region of image B corresponding to partial region R1 of image A is moved by one pixel in an x direction (FIG. 8B) and the position of maximum similarity is searched for the particular partial region. Subsequently, the partial region of image B corresponding to partial region R1 is moved pixel by pixel in the x direction to search for the position of maximum similarity for the particular partial region. Once the partial region of image B corresponding to partial region R1 of image A reaches the right end of image B, the same partial region is moved by one pixel in a y direction. In similar fashion, the partial region is moved pixel by pixel in the x direction from the left end to the right end of image B and the position of maximum similarity is searched for the particular partial regions. Finally, the partial regions corresponding to partial region R1 of image A are set to the lower right corner of image B as shown in FIG. 8C. In this way, the position of maximum similarity is searched for all the partial regions of image B corresponding to the partial region R1 of image A.

Figure 9A:
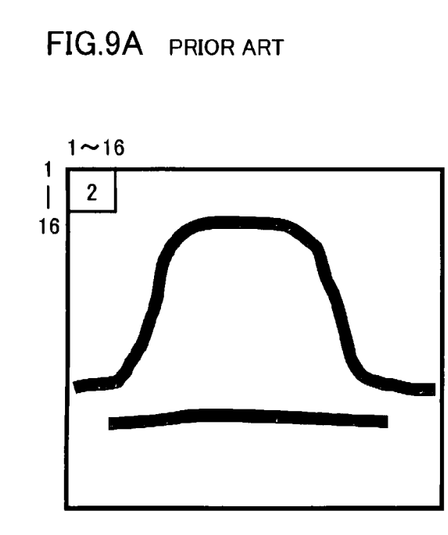
Figure 9B:
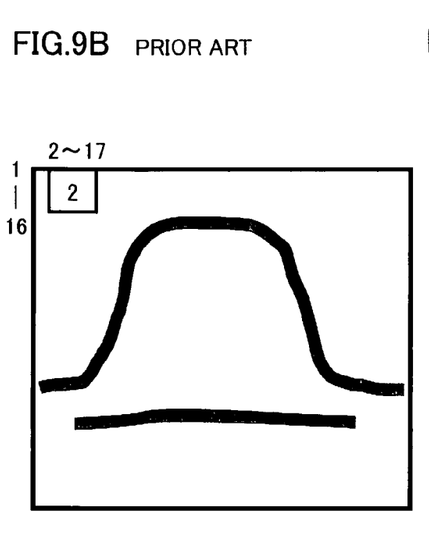
Figure 9C:
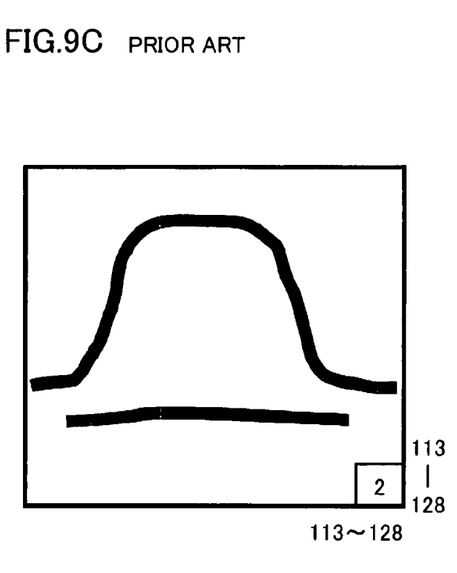

In similar fashion, a partial region corresponding to partial region R2 of image A is set at the coordinate (1, 1) of image B (FIG. 9A), and the position of maximum similarity is searched for the particular partial region. Next, the partial region of image B corresponding to partial region R2 of image A is moved by one pixel in the x direction (FIG. 9B), and the position of maximum similarity is searched for the particular partial region. Subsequently, the partial region of image B corresponding to partial region R2 of image A is moved pixel by pixel in the x direction to search for the position of maximum similarity. After reaching the right end of image B, the partial region is moved by one pixel in the y direction, and again moved in the x direction pixel by pixel from the left end to the right end of image B to search for the position of maximum similarity. Finally, the partial regions corresponding to partial region R2 of image A are set until the partial region of image B corresponding to partial region R2 of image A reaches the lower right corner of image B, as shown in FIG. 9C. In this way, the position of maximum similarity is searched for each of all the partial regions of image B corresponding to partial region R2 of image A.

A similar process is executed sequentially for partial regions R1 to R64 of image A. Specifically, after the search is repeated up to partial region R63, the partial region corresponding to partial region R64 of image A is set at the coordinate (1, 1) of image B (FIG. 10A), and the position of maximum similarity is searched for the particular partial region. Then, the particular region of image B corresponding to partial region R64 of image A is moved by one pixel in the x direction (FIG. 10B), and the position of maximum similarity is searched for the particular region. After that, the partial region of image B corresponding to partial region R64 of image A is moved pixel by pixel in the x direction to search for the position of maximum similarity. Once the right end of image B is reached, the partial region is moved by one pixel in the y direction and then moved pixel by pixel again in the x direction from left end to right end of image B to search for the position of maximum similarity. Finally, as shown in FIG.

Figure 10A:
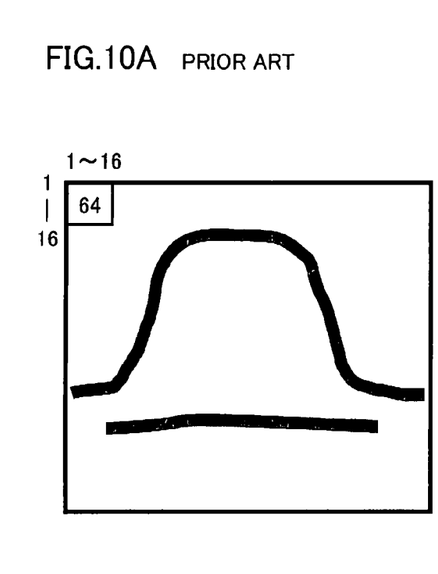
Figure 10B:
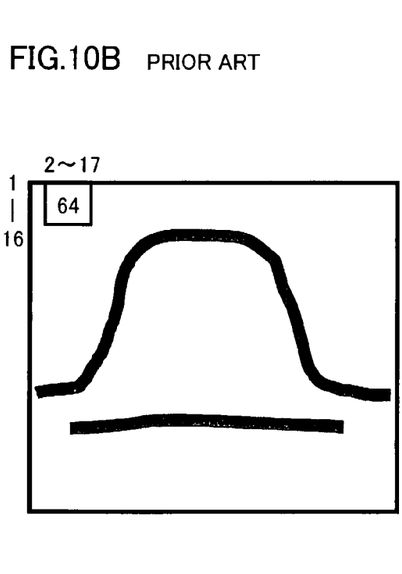
Figure 10C:
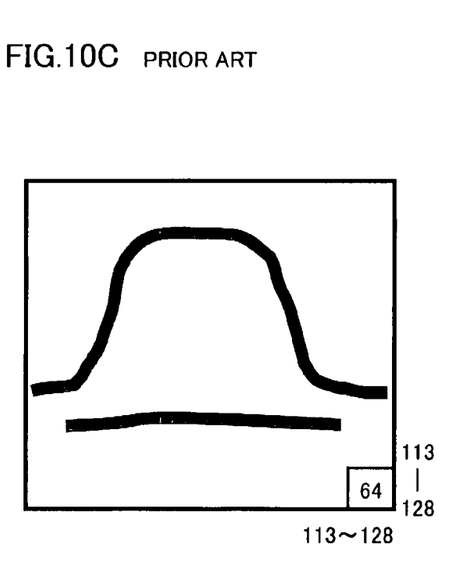

10C, the partial regions corresponding to partial region R64 of image A are set until the lower right corner of image B is reached. In this way, the position of maximum similarity is searched for each of all the partial regions of image B corresponding to partial regions R1 to R64 of image A.

In the process described above, the total number of searches is given as follows.

> Total number of searches=(number of the partial regions of image $B$ searched for one partial region of image $A$)×(number of partial regions of image $A$)

In the case under consideration, the number of the partial regions of image B searched for one partial region of image A is 12769, and the number of the partial regions of image A is 64. Thus, the total number of searches is given as 12769× 64=817,216.

As understood from this, the conventional matching method poses the problem that the total number of searches, i.e., the search amount is excessively large and so is the required processing amount, resulting in an excessively large consumption of both the processing time and power.

SUMMARY OF THE INVENTION

Accordingly, it is an object of this invention to provide an image matching device, an image matching method and an image matching program product which can shorten the processing time and reduce the power consumption.

In order to achieve the object described above, according to one aspect of the present invention, there is provided an image matching device including a matching unit which matches a first image and a second image with each other using a predetermined partial image of the first image, a determination unit which determines that the first image and the second image are different from each other, based on the result of the matching operation in the matching unit, and a partial image change unit which increases the predetermined partial image in the case where the determination unit fails to determine that the first image and the second image are different from each other. Herein, in the case where the determination unit fails to determine that the first image and the second image are different from each other, the matching unit further performs the matching operation using the increased predetermined partial image.

According to another aspect of the present invention, there is provided an image matching device including a matching unit which matches a first image and a second image with each other using a predetermined partial image of the first image, a determination unit which determines, based on the result of the matching operation in the matching unit, at least one of the fact that the first image and the second image are identical to each other and the fact that the first image and the second image are different from each other, and a partial image change unit which increases the predetermined partial image in the case where the determination unit determines neither the fact that the first image and the second image are identical to each other nor the fact that the first image and the second image are different from each other. Herein, in the case where the determination unit determines neither the fact that the first image and the second image are identical to each other nor the fact that the first image and the second image are different from each other, the matching unit further performs the matching operation using the increased predetermined partial image.

According to still another aspect of the present invention, there is provided an image matching method including a matching step of matching a first image and a second image with each other using a predetermined partial image of the first image, a determination step of determining that the first image and the second image are different from each other, based on the result in the matching step, and a partial image change step of increasing the predetermined partial image in the case where it is not determined in the determination step that the first image and the second image are different from each other. Herein, in the case where it is not determined in the determination step that the first image and the second image are different from each other, the matching operation is further performed in the matching step using the increased predetermined partial image.

According to yet another aspect of the present invention, there is provided an image matching method including a matching step of matching a first image and a second image with each other using a predetermined partial image of the first image, a determination step of determining, based on the result of the matching operation in the matching step, at least one of the fact that the first image and the second image are identical to each other and the fact that the first image and the second image are different from each other, and a partial image change step of increasing the predetermined partial image in the case where it is determined in the determination step that the first image and the second image are identical to each other and also that the first image and the second image are different from each other. Herein, in the case where it is not determined in the determination step that the first image and the second image are identical to each other and also that the first image and the second image are different from each other, the matching operation is further performed in the matching step using the increased predetermined partial image.

According to yet another aspect of the present invention, there is provided a program product which records a program for causing a computer to match a first image and a second image with each other. The program includes a matching step of matching the first image and the second image with each other using a predetermined partial image of the first image, a determination step of determining that the first image and the second image are different from each other, based on the result in the matching step, and a partial image change step of increasing the predetermined partial image in the case where it is not determined in the determination step that the first image and the second image are different from each other. Herein, in the case where it is not determined in the determination step that the first image and the second image are different from each other, the matching operation is further performed in the matching step using the increased predetermined partial image.

According to yet another aspect of the present invention, there is provided a program product which records a program for causing a computer to match a first image and a second image with each other. The program includes a matching step of matching a first image and a second image with each other using a predetermined partial image of the first image, a determination step of determining, based on the result of the matching operation in the matching step, at least one of the fact that the first image and the second image are identical to each other and the fact that the first image and the second image are different from each other, and a partial image change step of increasing the predetermined partial image in the case where it is determined in the determination step that the first image and the second image are identical to each other and also that the first image and the second image are different from each other. Herein, in the case where it is not determined in the determination step that the first image and the second image are identical to each other and also that the first image and the second image are different from each other, the matching operation is further performed in the matching step using the increased predetermined partial image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7 to 10C are diagrams for describing an image matching method according to the prior art.

DESCRIPTION OF THE PREFERRED EMBODIMENTS

First Embodiment

Figure 1:
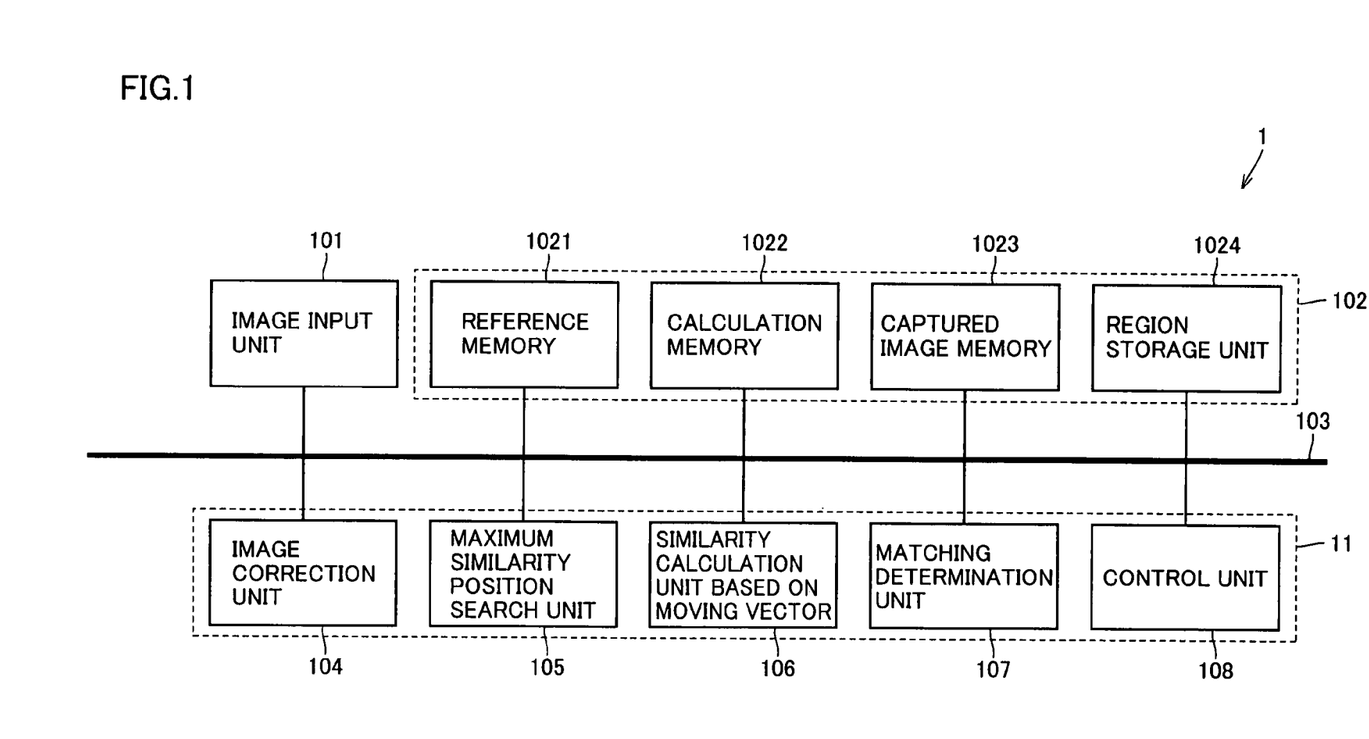
FIG. 1 is a block diagram showing a functional configuration of an image matching device 1 according to a first embodiment of the present invention.

Referring to FIG. 1, an image matching device according to a first embodiment includes an image input unit 101, a memory 102 corresponding to a memory 624 or a fixed disc 626 (FIG. 3), a bus 103 and a matching processing unit 11.

Matching processing unit 11 includes, an image correction unit 104, a maximum similarity position search unit 105, a similarity calculation unit 106 based on a moving vector (hereinafter referred to as the similarity calculation unit), a matching determination unit 107 and a control unit 108. Each part of matching processing unit 11 implements the function thereof by executing a corresponding program.

Image input unit 101 includes a fingerprint sensor and outputs fingerprint image data corresponding to a fingerprint read by the fingerprint sensor. The fingerprint sensor may be any one of optical, pressure and electrostatic capacity types.

Figure 2:
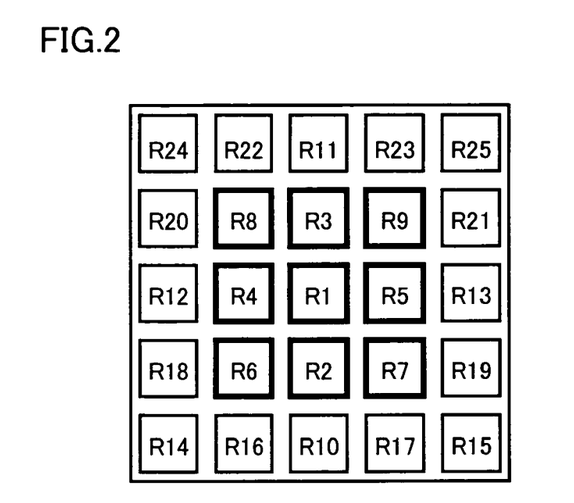
FIG. 2 is a diagram showing a specific example of the positional information of partial regions stored in a region storage unit 1024.

Memory 102 includes a reference memory 1021 for storing a reference image, a calculation memory 1022 for storing the result of various calculations, a captured image memory 1023 for storing an image captured as an object of matching, and a region storage unit 1024 for storing the positional information of partial regions making up each partial image of the object of matching. As shown in FIG. 2, region storage unit 1024 has stored therein the positional information of each of partial regions R1 to R25 set on the input image providing an object of matching. The positional information of partial regions R1 to R25 are preferably stored in region storage unit 1024 in the descending order of significance of the fingerprint features.

Bus 103 is used to transfer the control signals and the data signals between the component parts.

Image correction unit 104 corrects the gradation of the fingerprint image data from image input unit 101.

Maximum similarity search unit 105, using a plurality of partial regions of a first fingerprint image as templates, performs what is called the template matching by searching for a position in a second fingerprint image having the highest match with each template. The information on the search result is delivered to memory 102 and stored in calculation memory 1022.

Similarity calculation unit 106 calculates the similarity based on a moving vector described later using the result information of maximum similarity position search unit 105 stored in calculation memory 1022. The similarity thus calculated is delivered to a matching determination unit 107. Matching determination unit 107 determines the match or mismatch according the similarity calculated by similarity calculation unit 106.

Control unit 108 controls the process of each part of matching processing unit 11.

According to this embodiment, image correction unit 104, maximum similarity position search unit 105, similarity calculation unit 106, matching determination unit 107 and control unit 108 may wholly or partly be configured of an operation processor including a ROM such as a memory 624 (FIG. 3) storing the processing steps as a program and a CPU 622 (FIG. 3) or the like to execute the processing steps.

Figure 3:
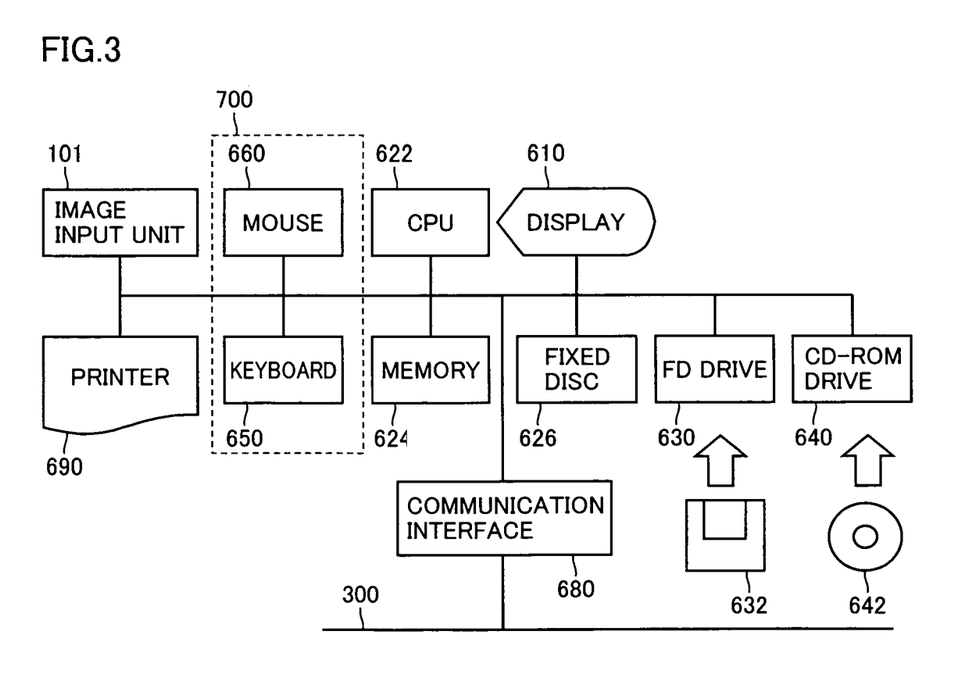
FIG. 3 is a diagram showing a specific example of the configuration of a computer having mounted thereon the image matching device according to each embodiment of the present invention.

Referring to FIG. 3, the computer including the image matching device according to each embodiment includes image input unit 101, a display 610 having a CRT (Cathode Ray Tube) or a liquid crystal, a CPU (Central Processing Unit) 622 to centrally manage and control the computer, memory 624 having a ROM (Read-Only Memory) or a RAM (Random Access Memory), a fixed disc 626, an FD drive 630 having removably mounted thereon an FD (Flexible Disc) 632 to access FD 632, a CD-ROM drive 640 having removably mounted thereon a CD-ROM (Compact Disc Read-Only Memory) 642 to access CD-ROM 642, a communication interface 680 to connect a communication network with the computer for communication, and an input unit 700 having a keyboard 650 and a mouse 660. These parts are connected for communication through a bus. Also, a printer 690 is connected as an external device.

The configuration shown in FIG. 3 is that of an ordinary computer, and the configuration of the computer according to this embodiment is not limited to the one shown in FIG. 3. For example, the computer may include a magnetic tape device accessible to a magnetic tape of cassette type mounted removably thereon.

Figure 4:
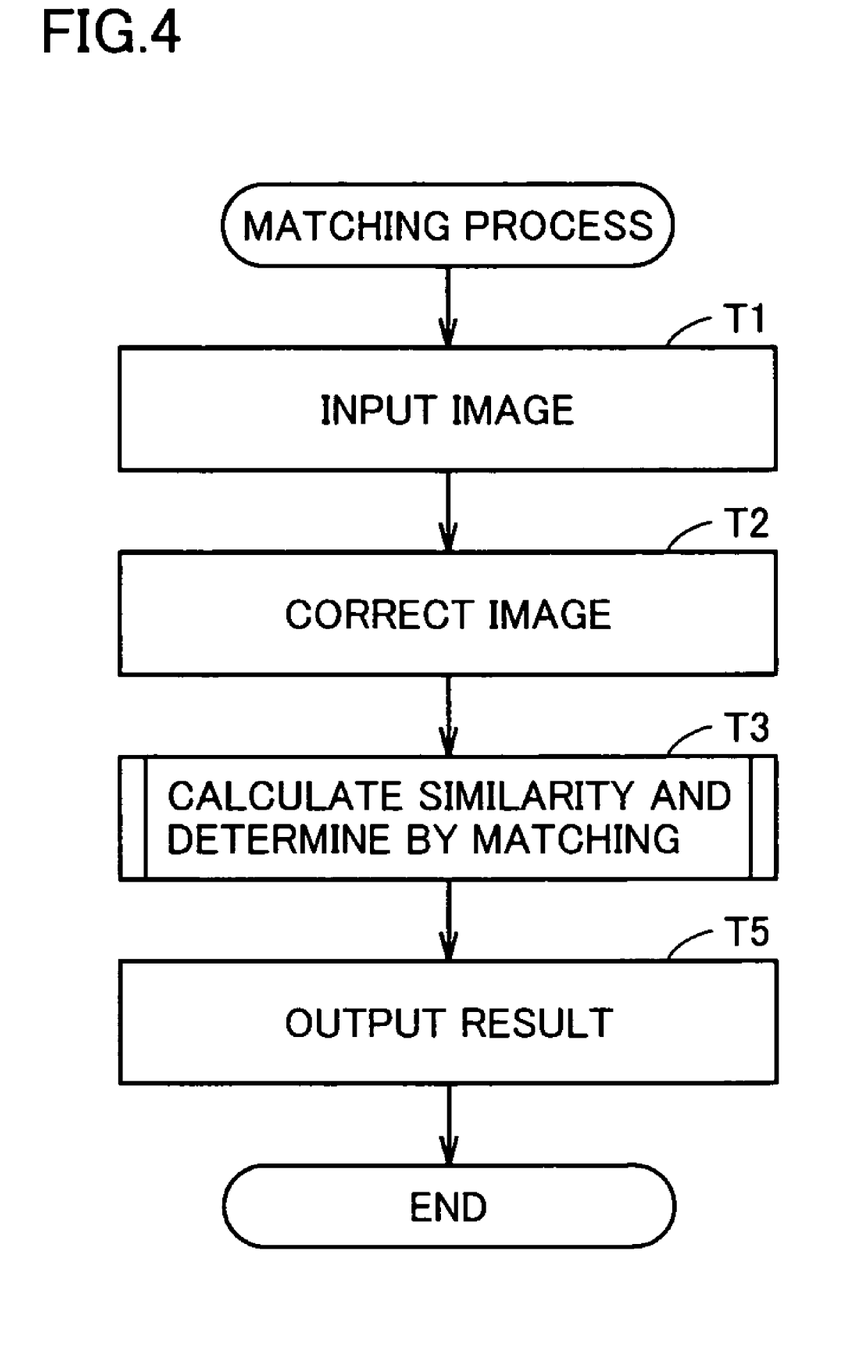
FIG. 4 is a flowchart showing an image matching process according to the first embodiment.

In image matching device 1 of FIG. 1, with reference to the flowchart of FIG. 4, the process of matching an image A providing a fingerprint image to be matched and an image B providing a reference fingerprint image is described. The process shown in the flowchart of FIG. 4 is implemented in such a manner that a CPU 622 of the computer with an image matching device according to this embodiment mounted thereon reads a corresponding program stored in a ROM or the like and deployed on a RAM to control each part shown in FIG. 1.

Referring to FIG. 4, control unit 108 sends an image input start signal to image input unit 101, and waits for receiving an image input end signal. Image input unit 101 is supplied with image A to be matched, and through bus 103, stores image A at a predetermined address of captured image memory 1023 (step T1). Image input unit 101, upon complete input of image A, sends an image input end signal to control unit 108.

Next, control unit 108 sends an image correction start signal to image correction unit 104, and then waits for receiving an image correction end signal. In many cases, the input image has no uniform image quality due to the variation in gradation of each pixel and overall density distribution in accordance with the characteristics of image input unit 101, the degree of dryness of the fingerprint or the pressure under which the finger is impressed. The input image data, therefore, cannot be properly used as it is for matching. In view of this, image correction unit 104 corrects the image quality of the input image in such a manner as to suppress the variations of the image input conditions (step T2). Specifically, with regard to image A stored in captured image memory 1023, the histogram is flattened ("Introduction to Computer Image Processing", published by Souken Shuppan, pp. 98-99) or the image is binarized (ditto, pp. 66-69) for the whole image corresponding to the input image data or each of small regions into which the image is divided.

Image correction unit 104, after correcting image A providing an input image in step T2, sends an image correction end signal to control unit 108. Image B providing a reference image is not limited to the one stored in reference memory 1021, but may be an image similarly input after the process in step T1. In such a case, image B as well as image A is corrected in step T2.

Next, similarity is calculated between image A corrected in step T2 and image B providing a reference image stored in reference memory 1021, and the matching is determined (step T3). The process executed in step T3 is described in detail later with reference to a subroutine.

Upon completion of the process in step T3, the matching result providing the result of matching determination is stored in calculation memory 1022. Matching determination unit 107 sends a matching determination end signal to control unit 108 thereby to end the process.

As the last step, the matching result stored in calculation memory 1022 is output through a display 610 or a printer 690 by control unit 108 (step T5), and the image matching is terminated.

Next, the process in step T3 described above is described with reference to the flowchart of FIG. 5.

First, control unit 108 sends a matching determination start signal to matching determination unit 107 and waits for the arrival of a matching determination end signal.

Subsequently, the matching process is executed in steps for each partial region. In the case where the number of the partial regions is extremely small and two, for example, it is difficult to determine whether image A and image B coincide or fail to coincide with each other. According to this embodiment, therefore, a first template matching process is executed using a predetermined number of partial regions, followed by a second template process by increasing the number of partial regions to assure high efficiency. Incidentally, the first template matching process described below is not essential and may be done without.

In the template matching process, image A and image B are searched to determine a particular one of a plurality of the partial regions of image B with which each of a plurality of partial regions of image A is most coincident. In other words, this process is executed to search for the position of maximum similarity.

Figure 5:
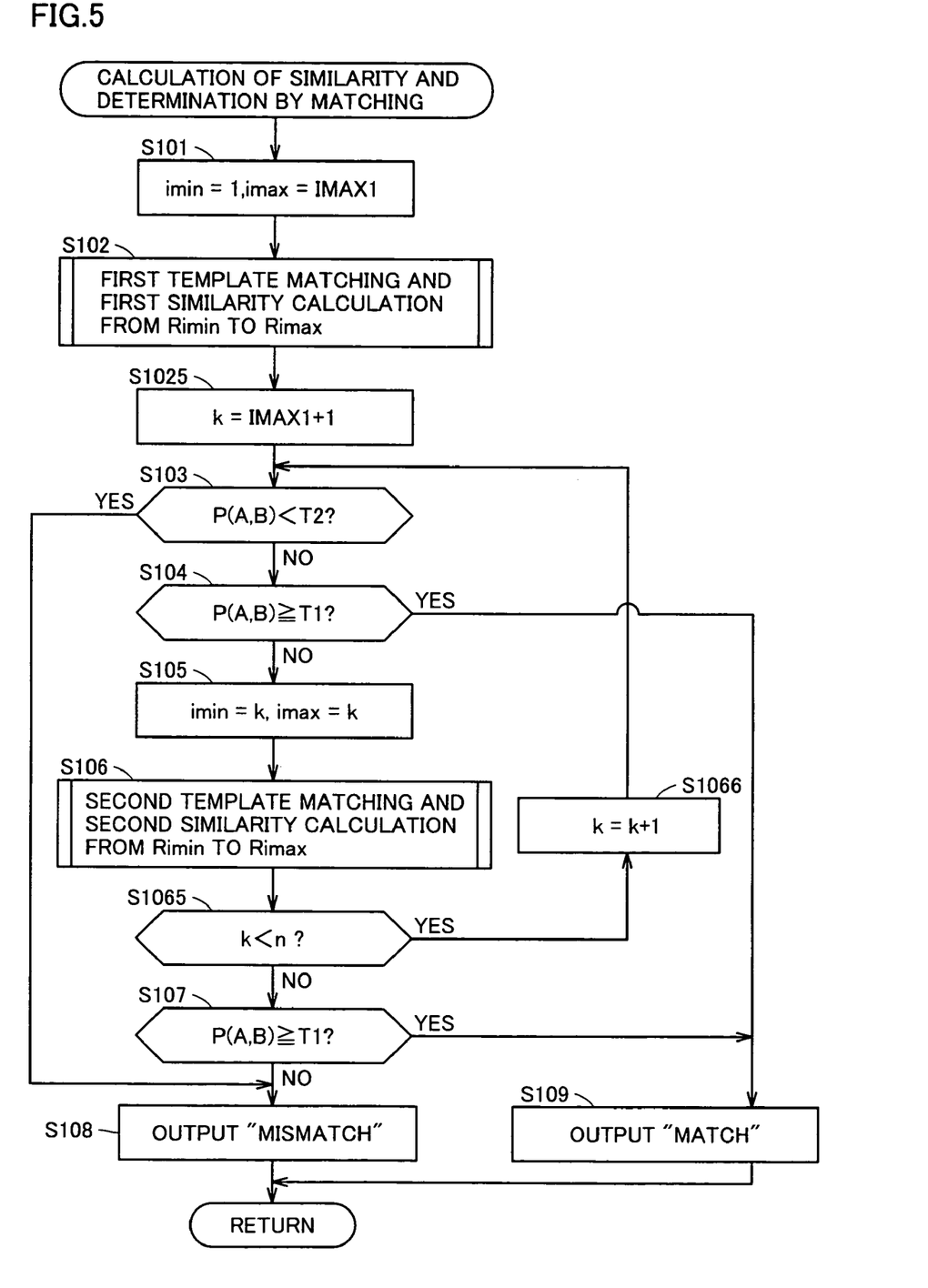
FIG. 5 is a flowchart showing a process of similarity calculation and matching determination in step T3.

Referring to FIG. 5, first, in step S101, 1 and an IMAX1 are set for a minimum value imin and a maximum value imax as an index i of partial regions Rimin to Rimax used in the first template matching. Assume, for example, that partial regions R1 to R9 of all partial regions R1 to R25 shown in FIG. 2 are set for partial regions Rimin to Rimax used for first template matching. As an index i of a partial region Ri, 1 is set for the minimum value imin and the IMAX1 of 9 for the maximum value imax.

In step S102, the first template matching process and the first similarity calculation are performed using the partial regions Rimin to Rimax involved. The template matching process and the similarity calculation performed in this case are described in detail later with reference to a subroutine.

As the result of the process executed in step S102, the similarity between image A and image B is obtained as a variable P(A, B) by the similarity calculation performed in similarity calculation unit 106. The variable P(A, B) thus obtained is stored at a predetermined address of calculation memory 1022. Similarity calculation unit 106 sends a similarity calculation end signal to control unit 108 and the process of step S102 is ended.

Next, in step S1025, IMAX1+1 is set for a value of a variable k as an index i of partial regions Rimin to Rimax used for the second template matching process. In steps S103, S104, the matching process is executed using the similarity P(A, B) obtained for the partial regions by the previous similarity calculation thereby to perform the matching determination.

In step S103, the similarity obtained by the previous similarity calculation and indicated by the value of variable P(A, B) stored in calculation memory 1022 is compared to a predetermined matching threshold T2. In the case where variable P(A, B) is smaller than T2 (YES in S103) as the result of comparison, image A and image B are determined as images sampled from different fingerprints, and a value such as 0 indicating "mismatch" as the matching result is written at a predetermined address of calculation memory 1022 (S108). Matching determination unit 107 sends a matching determination end signal to control unit 108 thereby to end the process. Otherwise (NO in S103), the process of step S104 is executed.

In step S104, the similarity indicated by variable P(A, B) is compared to predetermined matching threshold T1. In the case where comparison shows that variable P(A, B)≧T1 (YES in S104), it is determined that image A and image B are sampled from the same fingerprint, and a value such as 1 indicating the matching result of "match" is written at a predetermined address of calculation memory 1022 (S109). Then, matching determination unit 107 sends a matching determination end signal to control unit 108 thereby to end the process. Otherwise (NO in S104), the process of step S105 is executed.

In the case where a plurality of reference images are stored in reference memory 1021, most of the reference images probably fail to coincide with the image to be matched. Also, the processing speed can be improved by omitting the process of step S104. Therefore, the process of step S104 may be done without.

In step S105, a variable k is set together with minimum value imin and maximum value imax of index i of partial regions Rimin to Rimax used for template matching. In step S106, the second template matching and the second similarity calculation are performed using partial regions Rimin to Rimax (Rk) involved.

As a result of the process executed in step S106, the similarity calculation in similarity calculation unit 106 produces the similarity between image A and image B as variable P(A, B). Variable P(A, B) thus obtained is stored at a predetermined address of calculation memory 1022. Similarity calculation unit 106 sends a similarity calculation end signal to control unit 108 and the process of step S106 is ended.

At this juncture, assume that the value of variable k set as index i of partial regions Rimin to Rimax used for the second template matching is less than the total number n of partial regions Ri (YES in S1065). Variable k is incremented by one in step S1066 and the process is returned again to step S103.

The number by which variable k is incremented in step S1066 is not limited to 1, but may be a predetermined number more than 1. In the case where variable k is incremented by d at a time by setting k to k+d in step S1066, for example, minimum value imin of index i is set to k and maximum value imax thereof to k+d−1 in step S105.

Once the value of variable k set as index i of partial regions Rimin to Rimax used for the second template matching exceeds total number n of partial regions Ri (NO in step S1065), the similarity indicated by the value of variable P(A, B) stored in calculation memory 1022 is compared to predetermined matching threshold T1. In the case where comparison shows that variable P(A, B)≧T1 (YES in S107), image A and image B are determined as sampled from the same fingerprint, and a value (i.e., "1") indicating "match" is written as a result of matching at a predetermined address of calculation memory 1022 (S109). Then, matching determination unit 107 sends a matching determination end signal to control unit 108 thereby to end the process.

Figure 6:
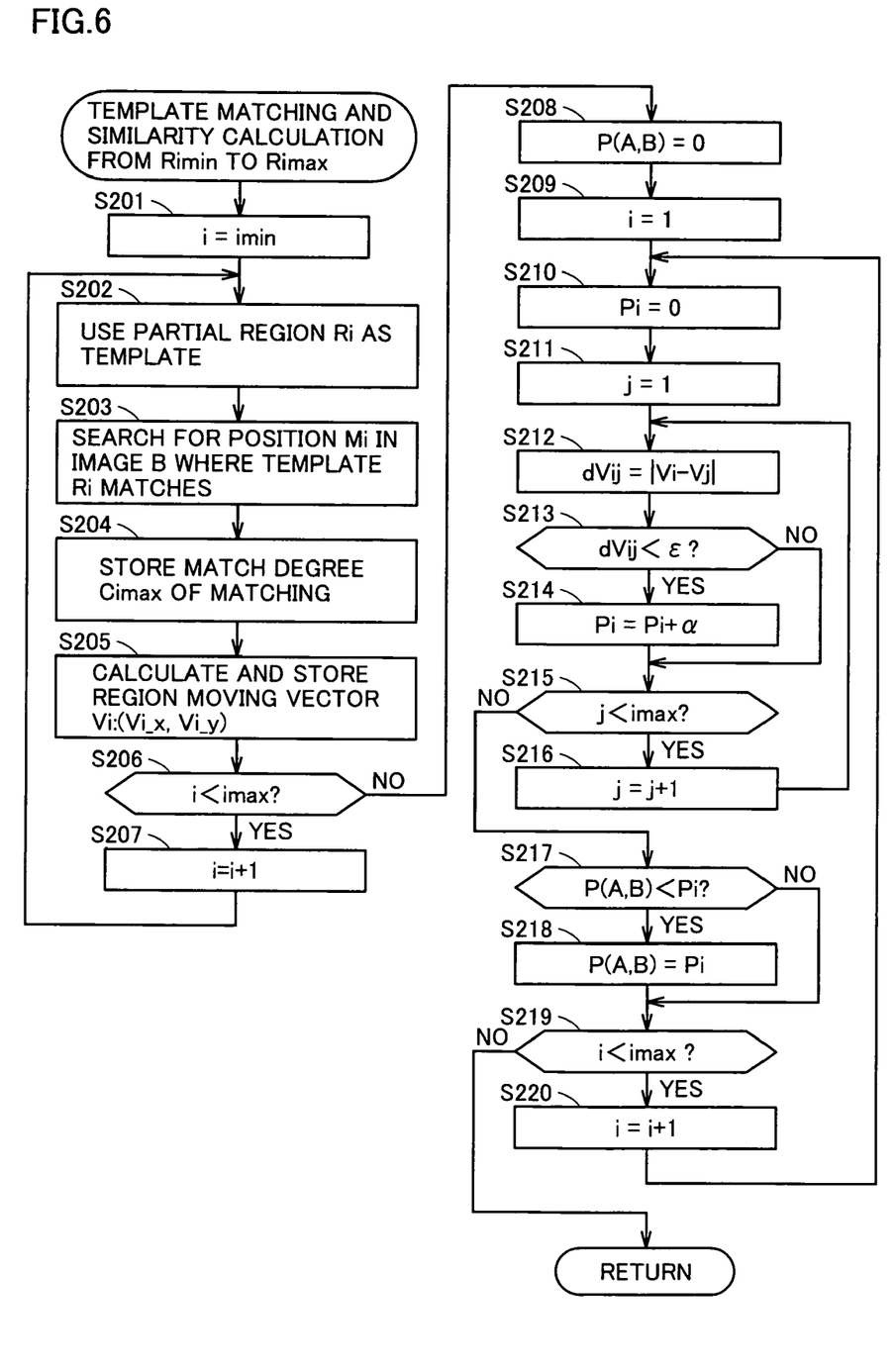
FIG. 6 is a flowchart showing a process of template matching and similarity calculation in steps S102, S106.

Further, with reference to the flowchart of FIG. 6, the template matching and the similarity calculation using partial regions Rimin to Rimax in steps S102, S106 described above are described. In steps S102, S106, the same process as that described later is executed, except that the value of index i of partial regions Rimin to Rimax of image A used for template matching is different.

First, control unit 108 sends a template matching start signal to a maximum similarity position search unit 105 and waits for the receipt of a template matching end signal. In maximum similarity position search unit 105, the template matching process is started as shown in steps S201 to S207.

The template matching is the process of searching to determine a partial region of image B with which each of a plurality of partial regions of image A is matched, i.e., the process of searching for the position of maximum similarity between image A and image B.

Once the template matching process is started, variable i of the counter is initialized to minimum value imin (imin=1 in step S102) of index of partial region Ri of image A used for matching in step S201.

Next, in step S201, an image corresponding to a partial region defined as partial region Ri in image A is set as a template used for template matching. Partial region Ri which is rectangular in this case to simplify the calculation is not limited to a rectangle.

Next, in step S203, a position of highest match in image B with the template set in step S202, i.e., a position where the data in the images are most coincident with each other is searched for. Specifically, the pixel density at a coordinate (x, y) with an origin at the upper left corner of partial region Ri used as a template is set as Ri(x, y), the pixel density at a coordinate (s, t) with the origin at the upper left corner of image B as B(s, t), the width of partial region Ri as w, and the maximum density that can be assumed by each pixel of image A and image B as V0. The match degree Ci(s, t) at coordinate (s, t) in image B is calculated based on the density difference of each pixel by the following equation (1).

$$Ci(s, t) = \sum_{y=1}^{h} \sum_{x=1}^{w} (V0 - |Ri(x, y) - B(s + x, t + y)|) \quad (1)$$

The coordinate (s, t) in image B is sequentially updated and the match degree C(s, t) at coordinate (s, t) is calculated. The position associated with the largest value thus obtained is considered highest in match degree, so that the image of the partial region at the particular position is set as partial region Mi and the match degree at the particular position as maximum similarity degree Cimax.

In step S204, the maximum similarity Cimax in image B of partial region Ri calculated in step S203 is stored at a predetermined address of calculation memory 1022. Also, in step S265, a moving vector Vi is calculated according to equation (2) and stored at a predetermined address of calculation memory 1022.

$$Vi=(Vix, Viy)=(Mix-Rix, Miy-Riy) \quad (2)$$

As described above, assume that image B is scanned based on partial region Ri corresponding to a position P in image A and that partial region Mi most coincident with partial region Ri is specified at a position M in image B. The direction vector from position P to position M is called a moving vector. This moving vector is obtained in view of the fact that different fingers are placed on a fingerprint sensor in different manners and therefore one image, say image B, appears to have moved with respect to the other image, say, image A.

In equation (2), variable Rix and variable Riy represent the x and y coordinates, respectively, of a reference position of partial region Ri, and correspond, for example, to the coordinate at the upper left corner of partial region Ri in image A. Variable Mix and variable Miy, on the other hand, represent the x and y coordinates, respectively, at the position associated with maximum similarity degree Cimax resulting from the search of partial region Mi and correspond, for example, to the coordinate at the upper left corner of partial region Mi at a matching position in image B.

Next, in step S206, it is determined whether counter variable i is less than maximum value imax of the index of partial region Ri of image A used for matching (in step S102, imax=9), and in the case where the value of variable i is less than maximum value imax, the process proceeds to step S207. Otherwise, the process proceeds to step S208.

In step S207, variable i is incremented by one. After that, as long as the value of variable i is less than maximum value imax of the partial regions, the process of steps S202 to S207 is repeated. Thus, the template matching is performed for all partial regions Ri, so that maximum similarity degree Cimax and moving vector Vi of each partial region Ri are calculated.

Maximum similarity position search unit 105 stores maximum similarity degree Cimax and moving vector Vi for all partial regions Ri calculated sequentially as described above at a predetermined address of calculation memory 1022, after which a template matching end signal is sent to control unit 108 thereby to end the process.

Then, control unit 108 sends a similarity calculation start signal to similarity calculation unit 106, and waits for the arrival of a similarity calculation end signal. In similarity calculation unit 106, the similarity is calculated by executing the process of steps S208 to S220 using the information such as moving vector Vi and maximum similarity degree Cimax of each partial region Ri obtained by template matching and stored in calculation memory 1022. The similarity calculation process is defined as a process of calculating the similarity between two images, i.e., image A and image B using the position of maximum similarity corresponding to each of a plurality of partial regions determined by the template matching process described above.

First, in step S208, similarity P(A, B) is initialized to 0. Similarity P(A, B) is defined as a variable storing the similarity between image A and image B. Next, in step S209, index i of moving vector Vi providing a reference is initialized to 1. Also, in step S210, similarity Pi of reference moving vector Vi is initialized to 0. Further, in step S211, index j of moving vector Vj is initialized to 1.

In step S212, the vectorial difference dVij between reference moving vector Vi and moving vector Vj is calculated by equation (3) below.

$$dVij=|Vi-Vj|=sqrt\{(Vix-Vjx)^2+(Viy-Vjy)^2\} \quad (3)$$

where variables Vix and Viy represent the x-direction component and the y-direction component, respectively, of moving vector Vi, variables Vjx and Vjy the x-direction component and the y-direction component, respectively, of moving vector Vj, and variable sqrt(X) the square root of X, and $X^2$ a formula to calculate the square of X.

In step S213, the vectorial difference dVij between moving vectors Vi and Vj is compared to a predetermined constant ϵ thereby to determine whether moving vector Vi and moving vector Vj can be regarded as substantially the same moving vector or not. Specifically, in the case where vectorial difference dVij is smaller than constant ϵ (YES in step S213), moving vector Vi and moving vector Vj are regarded as substantially the same, and the process proceeds to step S214. In the case where vectorial difference dVij is larger than constant ε (NO in S213), in contrast, they are not regarded as substantially the same, so that the process skips step S214 and proceeds to step S215. In step S214, similarity Pi is increased using the following equations (4) to (6).

$$Pi = Pi + \alpha \quad (4)$$

$$\alpha = 1 \quad (5)$$

$$\alpha = Cjmax \quad (6)$$

Variable α in equation (4) is a value to increase similarity Pi. In the case where variable α is set to 1 as shown in equation (5), similarity Pi represents the number of partial regions having the same moving vector as reference moving vector Vi. In the case where variable α is set to Cjmax as shown in equation (6), on the other hand, similarity Pi is the total sum of the maximum similarity degrees at the time of template matching for the partial regions having the same moving vector as reference moving vector Vi. Further, in accordance with the size of vectorial difference dVij, variable α may be decreased in value.

In step S215, it is determined whether index j is smaller than maximum value imax of the index for the partial regions, and in the case where it is determined that index j is smaller than maximum value imax of the index for the partial regions (YES in S215), the process proceeds to step S216. In the case where it is determined that index j is larger than maximum value imax (NO in S215), on the other hand, the process proceeds to step S217. In this way, the value of index j is incremented by one in step S216.

In the process of steps S210 to S216 described above, similarity Pi is calculated using the information on the partial regions determined to have the same moving vector as reference moving vector Vi. In step S217, similarity Pi obtained with moving vector Vi as a reference is compared to variable P(A, B), and in the case where similarity Pi is larger than the maximum similarity (value of variable P(A, B)) thus far obtained (YES in S217), the process proceeds to S218. Otherwise (NO in S217), the process proceeds to S219 while skipping step S218.

Specifically, in step S218, the value of similarity Pi obtained with moving vector Vi as a reference is set to variable P(A, B). In steps S217, S218, as long as similarity Pi obtained with moving vector Vi as a reference is larger than the maximum value (value of variable P(A, B)) of similarity thus far calculated with other moving vectors as a reference, a reference moving vector Vi is regarded to provide the most legitimate reference of all the indexes thus far obtained.

Next, in step S219, the value of index i of reference moving vector Vi is compared to maximum value imax of the index for the partial regions used for matching. In the case where index i is smaller than maximum value imax (YES in S219), the process proceeds to step S220 to increment index i by one, and then the process is returned to step S212.

By repeating the process of steps S210 to S220 until index i reaches maximum value imax (NO in S219), the similarity between image A and image B is calculated as the value of variable P(A, B). In similarity calculation unit 106, the value of variable P(A, B) calculated as described above is stored at a predetermined address of calculation memory 1022, and a similarity calculation end signal is sent to control unit 108 thereby to end the process.

In the image matching device according to this embodiment, the process described above is executed, and as soon as the match or mismatch can be determined by comparing only a part of one image to the other image, the matching process is terminated, while at the same time omitting the matching of the remaining parts of the image. In this way, the amount of calculation for image matching is reduced.

Further, in the case where a portion having a significant feature such as a fingerprint image is to be matched, the matching process is executed from the central portion of the fingerprint image. By doing so, the match or mismatch can be determined more often in the first stage of the matching process, thereby further reducing the calculation amount.

As a result, the image matching high in accuracy substantially free of the effects of environmental changes at the time of image input can be implemented in a shorter matching time with a smaller power consumption regardless of the presence or absence or the number of feature amount or clarity of the image.

Threshold T1 used in steps S104, S107 above is the minimum value of similarity to determine "match" of the matching result, and threshold T2 used in step S103 above is the maximum value of similarity to determine "mismatch".

According to this embodiment, similarity P(A, B) is a value accumulated each time of calculation of partial regions Ri, and therefore different values of thresholds T1, T2 may be used for each template matching session. Also, similarity P(A, B) may be corrected to use the same value of thresholds T1, T2 each time.

Thresholds T1, T2 can be determined by any of several methods. Specifically, two methods are described below.

In a first method, threshold T1 is set as a predetermined invariable value T (T1: constant), and threshold T2 as a value satisfying the equation T2=T+(k−1−n)×α (n: number of partial regions, k: variable used in step S1025, and α: value used in equation (4) and defined by equations (5), (6)). In the process shown in FIG. 5, variable k is incremented by one before matching determination, and therefore decremented by one in the equations described above.

Thresholds T1, T2 are determined in the manner described above. Even in the case where all the moving vectors for the uncalculated remaining partial regions Ri match between image A and image B, therefore, "mismatch" is the determination about the partial regions as a whole. As a result, the same matching result can be obtained as in the conventional matching method disclosed in Japanese Patent Laying-Open No. 2003-323618 described above.

A second method is described below in which thresholds T1, T2 are determined, while weighting the partial regions used for template matching.

In the case where a fingerprint image is handled for matching, for example, the positional information of partial regions R1 to R25 are stored in region storage unit 1024 shown in FIG. 2 in such an order that the portions of the finger liable to exhibit the fingerprint features are used in priority over the other portions. In such a case, match or mismatch can be determined at an early time before the complete calculation for all the partial regions substantially without affecting the matching accuracy.

Assume that threshold T1 is a value satisfying the relation T1=T+(k−1−n)×α1 (0<α1<T/n). Since the value (k−1−n) is negative, the value of threshold T1 is smaller than threshold T1 determined in the first method. This exhibits an especially significant effect for a small variable k (in other words, in the initial stages involving a small number of partial regions used for template matching).

By determining threshold T1 as described above, it is determined more often that image A and image B match with each other in the initial stages where partial regions liable to significantly exhibit fingerprint features are processed. Thus, the calculation amount can be expected to decrease.

Also, assume that threshold T2 is set to a value satisfying the relation T2=T+(k−1−n)×α2 (where 0<α2<α). Since (k−1−n) is negative, the value of threshold T2 is larger than threshold T1 determined in the first method. For a small variable k (i.e., in the initial stages involving a small number of partial regions used for template matching), therefore, an especially significant effect is displayed.

By determining threshold T2 in this way, the chance is increased to determine that image A and image B do not match with each other in the initial stages where partial regions liable to exhibit features as fingerprint images. Thus, the calculation amount is expected to decrease.

Second Embodiment

Each processing function of image matching device 1 described in the first embodiment is implemented with a program. According to the second embodiment, the program is stored in a computer-readable recording medium.

In this embodiment, a memory required for computer processing shown in FIG. 2 such as a memory 624 may be used as a program medium. As an alternative, a recording medium is removably mounted on an external memory of the computer so that the program can be read from the recording medium through the external memory. The external memory is a magnetic tape device (not shown), an FD drive 630 or a CD-ROM drive 640. The recording medium, on the other hand, is a magnetic tape (not shown), a FD 632 or a CD-ROM 642. In any case, the program stored in each recording medium can be accessed and executed by a CPU 622. As another alternative, the program is read in all cases from the recording medium and loaded into a predetermined program storage region shown in FIG. 2 such as the program storage region of memory 624, followed by being read and executed by CPU 622. This program to be loaded is stored in the computer in advance.

The recording medium and the computer proper are configured as separable units. A medium carrying a program fixedly is applicable as such a recording medium. Specific examples applicable as such recording media include a tape system including a magnetic tape or a cassette tape, a magnetic disc such as FD 632 or fixed disc 626, an optical disc system including an optical disc such as CD-ROM 642, MO (Magnetic Optical Disc), MD (Mini Disc) or DVD (Digital Versatile Disc), a card system such as an IC card (including a memory card) or an optical card, and a semiconductor memory such as a mask ROM, an EPROM (Erasable Programmable ROM), an EEPROM (Electrically EPROM) (R) or a flash ROM.

Also, the computer shown in FIG. 2, which is adapted for connection by communication with a communication network 300 including the internet, may employ a recording medium to dynamically carry the program downloaded from communication network 300. In the case where the program is downloaded from communication network 300, the program to be downloaded may be stored in the computer in advance or installed into the computer in advance from another recording medium.

The contents stored in the recording medium are not limited to a program but may be data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image matching device comprising:
    a matching unit matching a first image and a second image with each other using a predetermined partial image of said first image;
    a determination unit making determination that said first image and said second image are different from each other, based on the result of the matching operation in said matching unit; and
    a partial image change unit increasing said predetermined partial image in the case where said determination unit fails to determine that said first image and said second image are different from each other, wherein
    said matching unit further performs said matching operation using said predetermined partial image increased in the case where said determination unit fails to determine that said first image and said second image are different from each other.

2. An image matching device comprising:
    a matching unit matching a first image and a second image with each other using a predetermined partial image of said first image;
    a determination unit making determination, based on the result of the matching operation in said matching unit, at least one of the fact that said first image and said second image are identical to each other and the fact that said first image and said second image are different from each other; and
    a partial image change unit increasing said predetermined partial image in the case where said determination unit determines neither the fact that said first image and said second image are identical to each other nor the fact that said first image and said second image are different from each other, wherein
    said matching unit further performs said matching operation using said predetermined partial image increased in the case where said determination unit determines neither the fact that said first image and said second image are identical to each other nor the fact that said first image and said second image are different from each other.

3. The image matching device according to claim 1 or 2, wherein
    said determination unit makes determination that said first image and said second image are identical to each other using a first threshold and determination that said first image and said second image are different from each other using a second threshold.

4. The image matching device according to claim 3, wherein
    at least selected one of said first threshold and said threshold changes with the increase in said predetermined partial image in said partial image change unit.

5. The image matching device according to claim 1 or 2, wherein
    said predetermined partial image includes a plurality of partial regions,
    said matching unit includes:
    a maximum similarity position search unit searching for the position of the region in said second image where the degree of match degree with each of said partial regions is maximum; and
    a similarity calculation unit calculating and outputting the similarity between said first image and said second image based on the amount of the positional relation indicating the relative positions of a reference position for measuring the position of the region in said second image corresponding to each of said partial regions and said position of maximum similarity searched for by said maximum similarity position search unit, and
    said determination unit makes said determination based on said similarity.

6. The image matching device according to claim 1 or 2, wherein
said partial image change unit includes a storage unit to store the partial regions of said first image in the descending order of significance of the features of said first image.

7. The image matching device according to claim 1 or 2, wherein
said first image and said second image are fingerprint images.

8. The image matching device according to claim 7, wherein
said storage unit stores, as partial regions having significant features, the partial regions of said first image corresponding to the central portion of the fingerprints in priority over the other partial regions.

9. An image matching method comprising:
a matching step of matching a first image and a second image with each other using a predetermined partial image of said first image;
a determination step of determining that said first image and said second image are different from each other, based on the result of the matching operation in said matching step; and
a partial image change step of increasing said predetermined partial image in the case where it is not determined in said determination step that said first image and said second image are different from each other, wherein
said matching operation is further performed in said matching step using said predetermined partial image increased in the case where it is not determined in said determination step that said first image and said second image are different from each other.

10. An image matching method comprising:
a matching step of matching a first image and a second image with each other using a predetermined partial image of said first image;
a determination step of determining, based on the result of the matching operation in said matching step, at least one of the fact that said first image and said second image are identical to each other and the fact that said first image and said second image are different from each other; and
a partial image change step of increasing said predetermined partial image in the case where it is determined in said determination step that said first image and said second image are identical to each other and also that said first image and said second image are different from each other, wherein
said matching operation is further performed in said matching step using said predetermined partial image increased in the case where it is not determined in said determination step that said first image and said second image are identical to each other and also that said first image and said second image are different from each other.

11. A computer-readable medium storing a program for causing a computer to match a first image and a second image with each other, said program comprising:
a matching step of matching said first image and said second image with each other using a predetermined partial image of said first image;
a determination step of determining that said first image and said second image are different from each other, based on the result of the matching operation in said matching step; and
a partial image change step of increasing said predetermined partial image in the case where it is not determined in said determination step that said first image and said second image are different from each other, wherein
said matching operation is further performed in said matching step using said predetermined partial image increased in the case where it is not determined in said determination step that said first image and said second image are different from each other.

12. A computer-readable medium storing a program for causing a computer to match a first image and a second image with each other, said program comprising:
a matching step of matching a first image and a second image with each other using a predetermined partial image of said first image;
a determination step of determining, based on the result of the matching operation in said matching step, at least one of the fact that said first image and said second image are identical to each other and the fact that said first image and said second image are different from each other; and
a partial image change step of increasing said predetermined partial image in the case where it is determined in said determination step that said first image and said second image are identical to each other and also that said first image and said second image are different from each other, wherein
said matching operation is further performed in said matching step using said predetermined partial image increased in the case where it is not determined in said determination step that said first image and said second image are identical to each other and also that said first image and said second image are different from each other.

* * * * *